(12) United States Patent
Sadakane

(10) Patent No.: US 10,494,988 B2
(45) Date of Patent: Dec. 3, 2019

(54) CONTROL DEVICE FOR INTERNAL COMBUSTION ENGINE THAT CONTROLS FUEL SUPPLY TO CYLINDERS AND PREVENTS MISFIRING

(71) Applicant: TOYOTA JIDOSHA KABUSHIKI KAISHA, Toyota-shi, Aishi-ken (JP)

(72) Inventor: Shinji Sadakane, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 189 days.

(21) Appl. No.: 15/323,338

(22) PCT Filed: Jul. 2, 2015

(86) PCT No.: PCT/JP2015/003338
§ 371 (c)(1),
(2) Date: Dec. 30, 2016

(87) PCT Pub. No.: WO2016/031113
PCT Pub. Date: Mar. 3, 2016

(65) Prior Publication Data
US 2017/0175681 A1   Jun. 22, 2017

(30) Foreign Application Priority Data
Aug. 29, 2014   (JP) .................. 2014-175236

(51) Int. Cl.
*F02B 29/04* (2006.01)
*F02D 41/00* (2006.01)
(Continued)

(52) U.S. Cl.
CPC .......... *F02B 29/0468* (2013.01); *F02B 75/22* (2013.01); *F02D 17/02* (2013.01);
(Continued)

(58) Field of Classification Search
CPC . F02D 41/123; F02D 41/0005; F02B 29/0468
(Continued)

(56) References Cited

U.S. PATENT DOCUMENTS 8,919,097 B2* 12/2014 Kerns ................. F02D 41/0087
123/198 F
8,961,368 B2* 2/2015 Glugla .................. B60W 20/15
477/110
(Continued)

FOREIGN PATENT DOCUMENTS

CN 103726922 A 4/2014
JP 2010059921 A 3/2010
(Continued)

OTHER PUBLICATIONS

International Search Report of PCT/JP2015/003338 dated Sep. 15, 2015 [PCT/ISA/210].
(Continued)

*Primary Examiner* — Mary Davis
*Assistant Examiner* — Edward Bushard
(74) *Attorney, Agent, or Firm* — Sughrue Mion, PLLC

(57) ABSTRACT

A control device for an internal combustion engine can prevent misfiring in cylinders of the internal combustion engine. When a deceleration request is issued while the engine load of an internal combustion engine is in a predetermined high-load region, and the vehicle is decelerated so that the engine load transitions from the high-load region to a low-load region to respond to the deceleration request, the control device performs control that continues a fuel supply from injectors of a first cylinder and a fourth cylinder, and cuts a fuel supply from injectors of a second cylinder and a third cylinder. Furthermore, condensed water generated in an intercooler is caused to flow between two guide devices provided at the bottom of a convergence portion of an intake
(Continued)

manifold to thereby flow into intake branch pipes of the second cylinder and third cylinder.

4 Claims, 5 Drawing Sheets

(51) Int. Cl.
| | |
|---|---|
| *F02M 35/10* | (2006.01) |
| *F02M 35/104* | (2006.01) |
| *F02D 41/12* | (2006.01) |
| *F02D 17/02* | (2006.01) |
| *F02M 25/028* | (2006.01) |
| *F02M 26/06* | (2016.01) |
| *F02B 75/22* | (2006.01) |

(52) U.S. Cl.
CPC ....... *F02D 41/005* (2013.01); *F02D 41/0087* (2013.01); *F02D 41/123* (2013.01); *F02M 25/028* (2013.01); *F02M 26/06* (2016.02); *F02M 35/1045* (2013.01); *F02M 35/10262* (2013.01); *Y02T 10/146* (2013.01); *Y02T 10/47* (2013.01)

(58) Field of Classification Search
USPC ........................................................ 123/563
See application file for complete search history.

(56) References Cited

U.S. PATENT DOCUMENTS

| | | | |
|---|---|---|---|
| 9,127,607 B2 * | 9/2015 | Glugla | ................ F02D 41/0085 |
| 9,133,757 B2 * | 9/2015 | Glugla | .................. F02D 41/123 |
| 9,181,859 B2 * | 11/2015 | Glugla | .................... F02B 37/18 |
| 9,284,880 B2 * | 3/2016 | Glugla | .................. B60W 20/15 |
| 9,488,152 B2 * | 11/2016 | Glugla | ................ F02D 41/3029 |
| 9,752,495 B2 * | 9/2017 | Glugla | ................ F02D 41/3029 |
| 2012/0303250 A1 | 11/2012 | Nogami et al. | |
| 2013/0090839 A1 | 4/2013 | Ishigami et al. | |
| 2013/0133630 A1 * | 5/2013 | Watanabe | ........ F02M 35/10262 123/527 |
| 2014/0100074 A1 | 4/2014 | Glugla | |
| 2017/0175681 A1 * | 6/2017 | Sadakane | ............ F02D 41/0087 |

FOREIGN PATENT DOCUMENTS

| | | |
|---|---|---|
| JP | 2012-246849 A | 12/2012 |
| JP | 5277351 B2 | 8/2013 |

OTHER PUBLICATIONS

Written Opinion of PCT/JP2015/003338 dated Sep. 15, 2015 [PCT/ISA/237].

* cited by examiner

[Fig. 1]
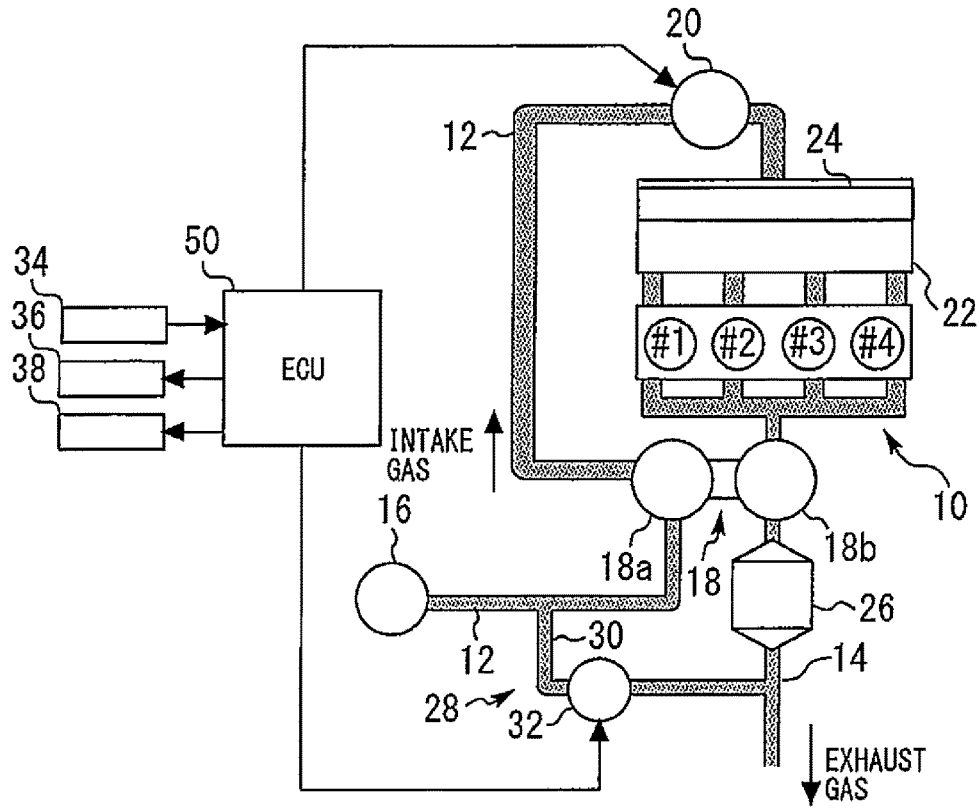
[Fig. 2]
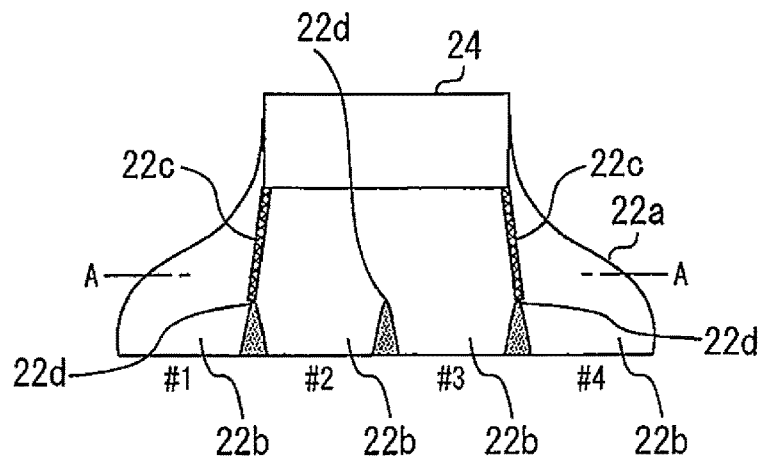
[Fig. 3]
A-A
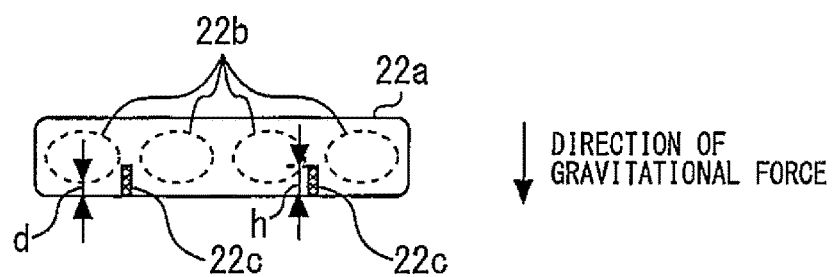

[Fig. 4]
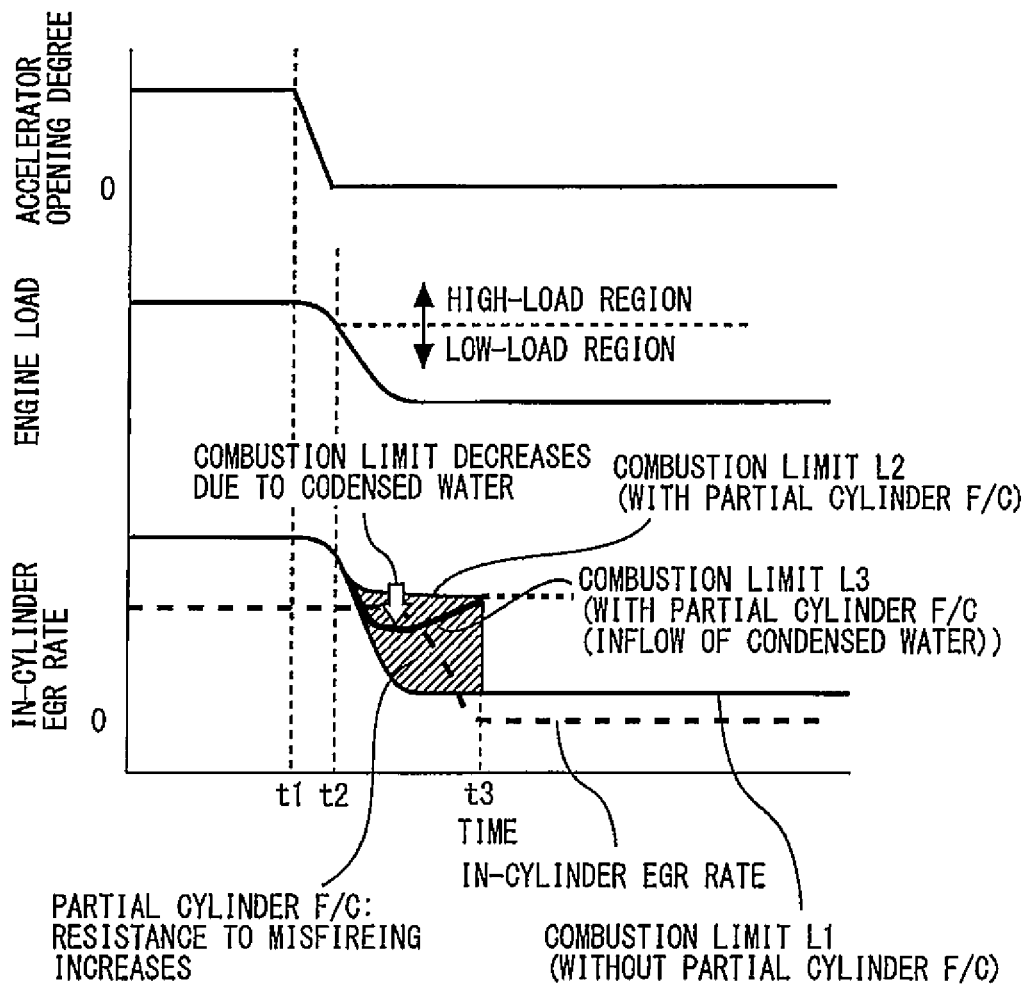
[Fig. 5]
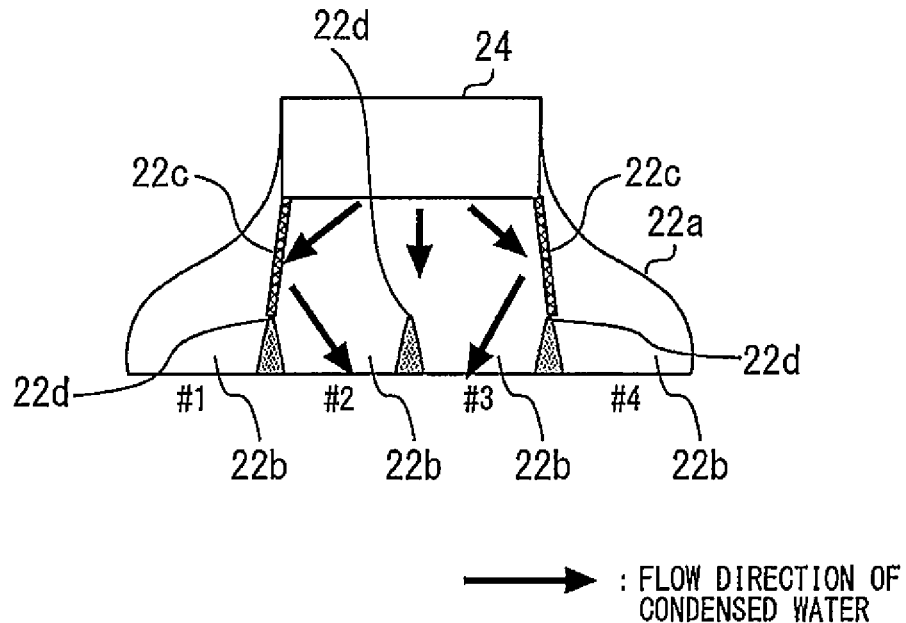

[Fig. 6]
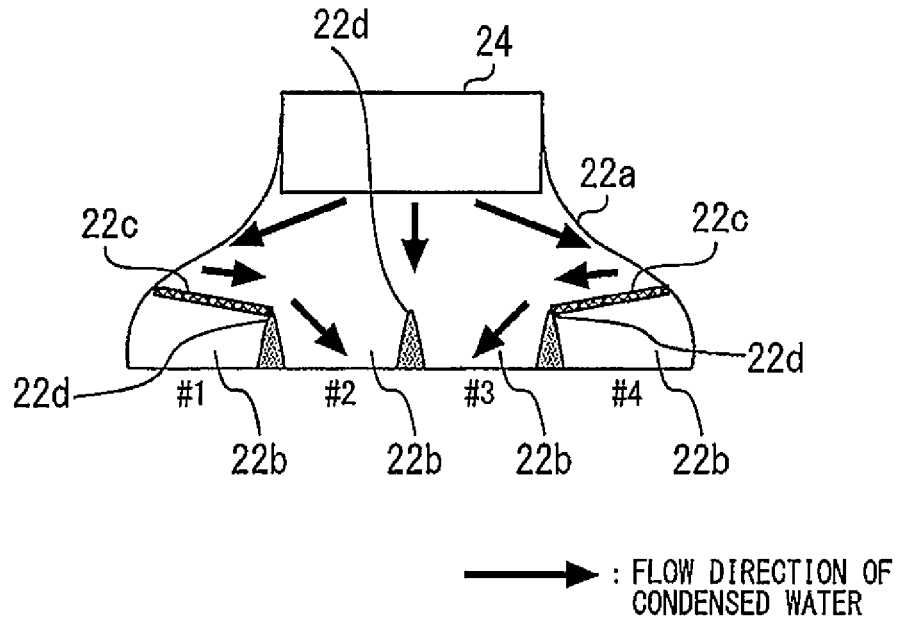
→ : FLOW DIRECTION OF CONDENSED WATER
[Fig. 7]
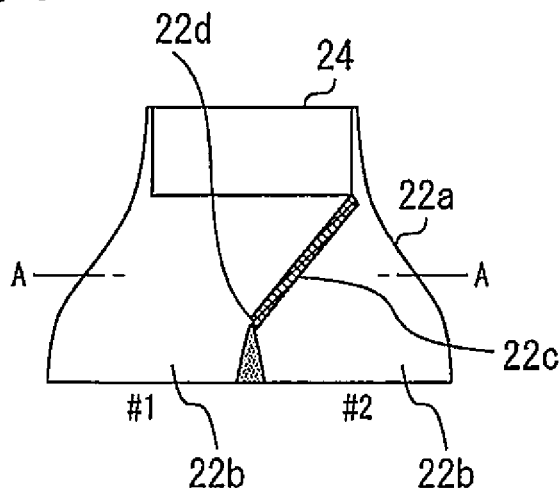
[Fig. 8]
A-A
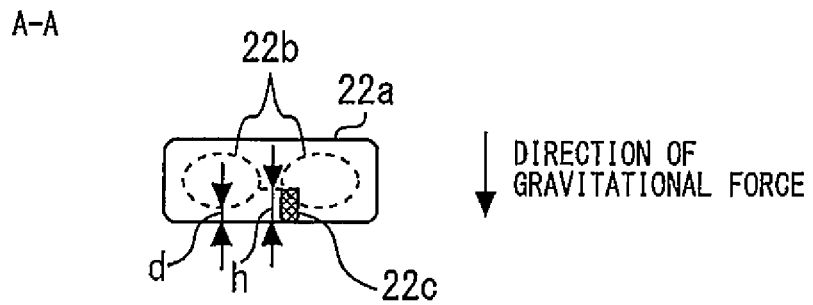
↓ DIRECTION OF GRAVITATIONAL FORCE

[Fig. 9]
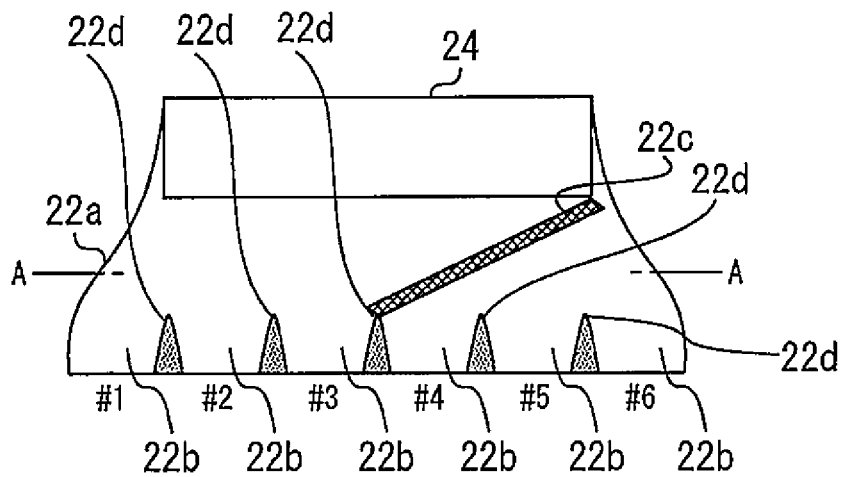
[Fig. 10]
A-A
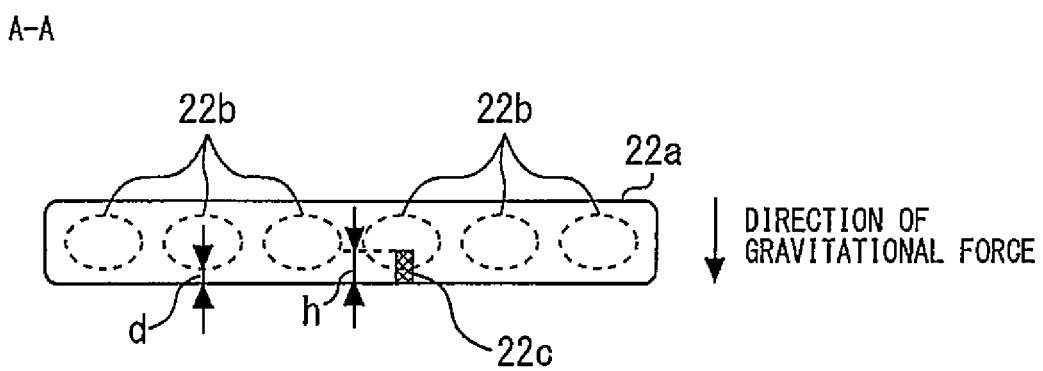
[Fig. 11]
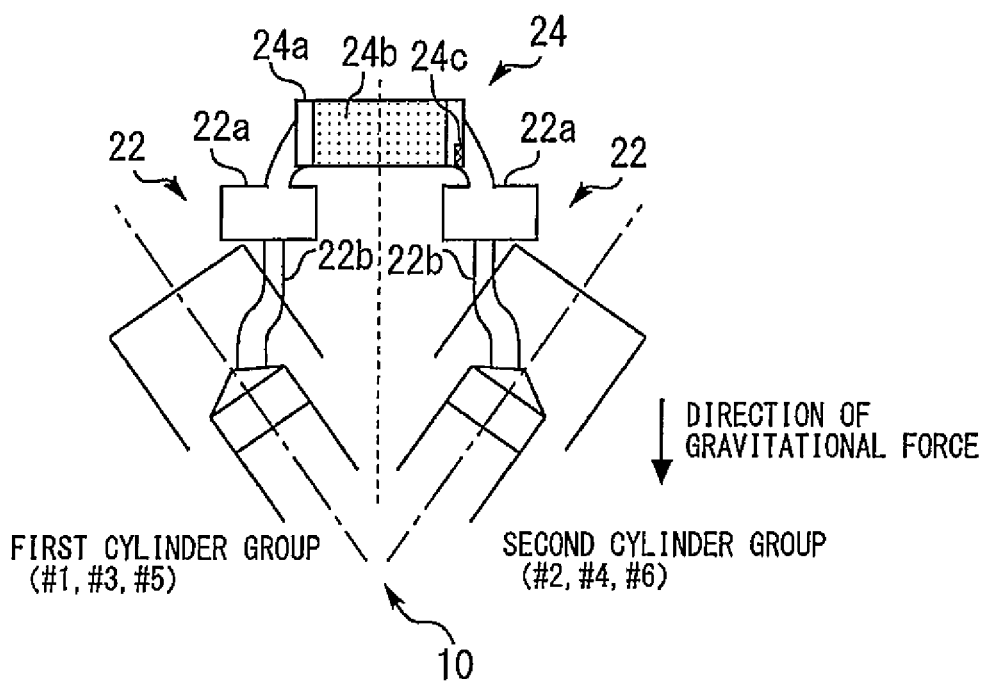

[Fig. 12]
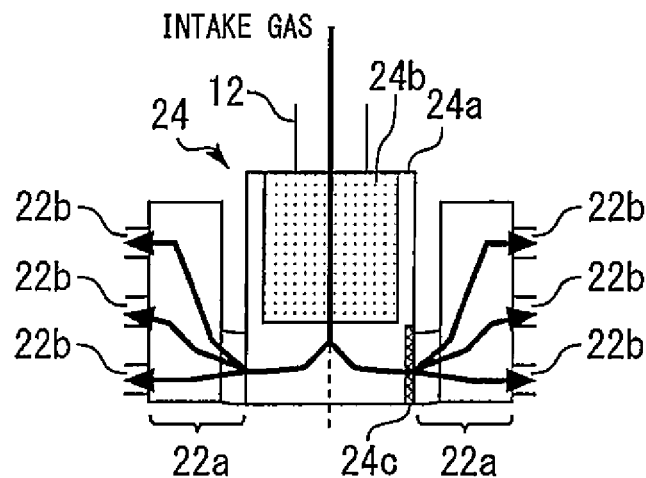
[Fig. 13]
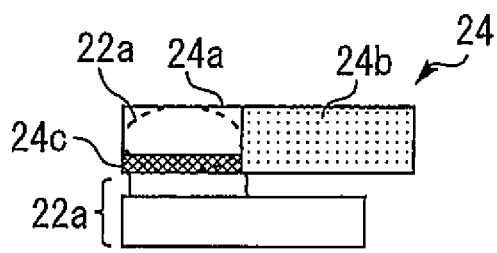
[Fig. 14]
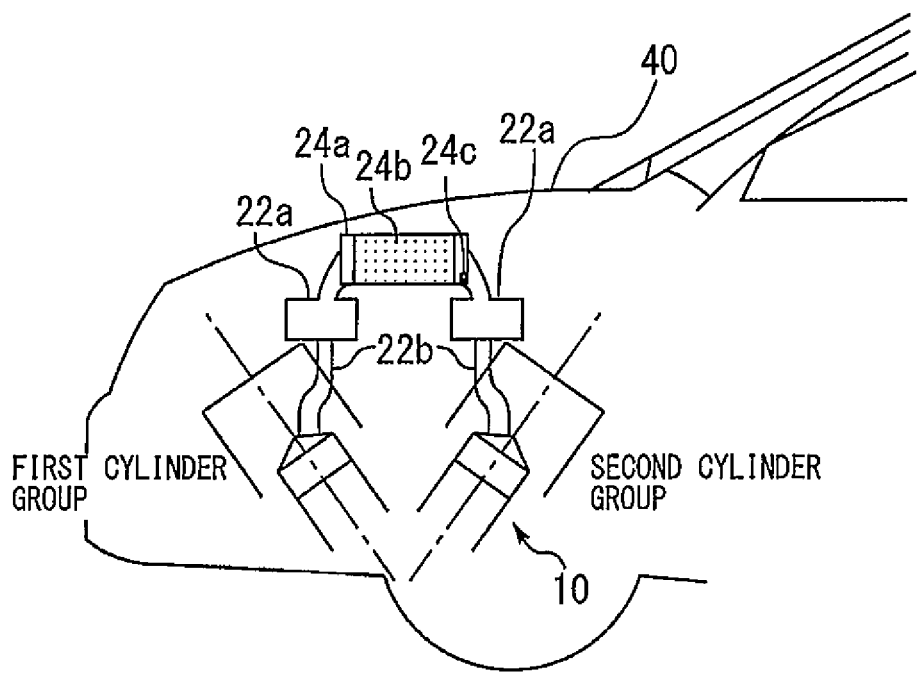

CONTROL DEVICE FOR INTERNAL COMBUSTION ENGINE THAT CONTROLS FUEL SUPPLY TO CYLINDERS AND PREVENTS MISFIRING

CROSS REFERENCE TO RELATED APPLICATIONS

This application is a National Stage of International Application No. PCT/JP2015/003338, filed Jul. 2, 2015, claiming priority based on Japanese Patent Application No. 2014-175236, filed Aug. 29, 2014, the contents of all of which are incorporated herein by reference in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE

Not applicable.

STATEMENT REGARDING PRIOR DISCLOSURES BY THE INVENTOR OR A JOINT INVENTOR

Not applicable.

BACKGROUND

This invention relates to an internal combustion engine, and more particularly to an internal combustion engine equipped with an EGR device that recirculates a portion of exhaust gas into an intake passage.

An internal combustion engine is already known that is equipped with an EGR device that has an EGR passage connecting an exhaust passage and an intake passage, and that causes a portion of exhaust gas that flows through an exhaust passage on a downstream side of a turbine to recirculate as EGR gas through the EGR passage to an intake passage on an upstream side of a compressor. A distinction is made between the above-described kind of EGR device and an EGR device that causes a portion of exhaust gas that flows through an exhaust passage on an upstream side of a turbine to recirculate via an EGR passage to an intake passage on a downstream side of a compressor, with the above-described kind of EGR device being referred to as a "low-pressure EGR device".

According to the low-pressure EGR device, since EGR gas can be recirculated with intake air before pressure-charging, a large amount of EGR gas can be introduced into the internal combustion engine. On the other hand, in a vehicle in which this kind of internal combustion engine is mounted, if a deceleration request is issued while EGR gas is recirculating, there is the possibility that the large amount of EGR gas that was recirculated into the intake passage will cause misfiring of the internal combustion engine. Consequently, various countermeasures with respect to misfiring that is caused by EGR gas during vehicle deceleration are being implemented in internal combustion engines equipped with a low-pressure EGR device. An internal combustion engine in which such a kind of misfire countermeasure is implemented is disclosed, for example, in Patent Literature 1 (Japanese Patent No. 5277351).

The internal combustion engine disclosed in Patent Literature 1 includes: an EGR valve that is provided in an EGR passage; a throttle valve that is provided further on a downstream side than a connecting portion with an EGR passage of an intake passage; a bypass passage that connects an upstream side of the connecting portion in the intake passage with a downstream side of the throttle valve; and a bypass valve that is provided in the bypass passage and that controls the amount of fresh air introduced into a combustion chamber of the internal combustion engine through the bypass passage. According to this system, if it is determined that the aforementioned internal combustion engine is in a decelerating operation state, the aforementioned EGR valve is actuated so as to fully close. Furthermore, if it is determined that the internal combustion engine is misfiring, the aforementioned bypass valve is actuated in a valve-opening direction and the aforementioned throttle valve is actuated in a valve-closing direction.

By actuating the aforementioned EGR valve so as to fully close, the amount of EGR gas that recirculates to the intake passage during vehicle deceleration can be made zero. However, even in a case where the aforementioned EGR valve is actuated so as to fully close, EGR gas that was introduced into the intake passage prior to closing the EGR valve flows into the combustion chamber with a delay relative to the timing of closing the EGR valve, and hence that EGR gas becomes a factor that causes the internal combustion engine to misfire. In this respect, according to the system described in Patent Literature 1, since the bypass valve and the throttle valve operate as described above, the proportion of EGR gas contained in intake gas (a mixed gas of EGR gas and fresh air; the same applies hereunder) that is introduced into the combustion chamber at a time of vehicle deceleration can be reduced. Hence, misfiring of the internal combustion engine that is attributable to EGR gas during vehicle deceleration can be avoided.

CITATION LIST-PATENT LITERATURE

[PTL 1]: Japanese Patent No. 5277351
[PTL 2]: Japanese Patent Laid-Open No. 2012-246849

SUMMARY

Technical Problem

In this connection, as an aforementioned misfire countermeasure, the present inventor is in currently investigating the performance of fuel-cut control that, at a time of vehicle deceleration, continues the fuel supply to some cylinders of an internal combustion engine and cuts the fuel supply to the remaining cylinders. By performing such fuel-cut control, the load per cylinder can be increased in a cylinder to which the fuel supply is continued (hereunder, referred to as "fuel supply cylinder"), and hence the resistance to misfiring with respect to EGR gas in a fuel supply cylinder can be increased.

However, in an internal combustion engine equipped with a low-pressure EGR device, in some cases condensed water is generated in an intercooler as a result of intake gas that was compressed by a compressor being cooled when passing through the intercooler. If condensed water is generated in an intercooler, the condensed water is discharged from the intercooler together with EGR gas or fresh air that flows through the intake passage, and the condensed water flows along the bottom of the intake passage on the downstream side of the intercooler and into a combustion chamber of the internal combustion engine.

Generation of condensed water in an intercooler and the consequent inflow of the condensed water into a combustion chamber can occur the time of vehicle deceleration. Therefore, even if the above described fuel-cut control is performed, there is a possibility that condensed water generated in an intercooler will flow through the intake passage on the downstream side of the intercooler, and the condensed water will cause misfiring to occur when the condensed water flows into a fuel supply cylinder.

The present invention has been made to solve the above described problem. That is, an object of the present invention is to suppress the occurrence of misfiring at a time of vehicle deceleration in an internal combustion engine equipped with a low-pressure EGR device.

Solution to Problem

In order to solve the aforementioned problem, a first invention is an internal combustion engine that is mounted in a vehicle, comprising: a compressor that compresses intake gas that flows through an intake passage; an intercooler that cools intake gas that is compressed by the compressor; a plurality of intake branch pipes that branch on a downstream side relative to the intercooler; an EGR device that causes a portion of exhaust gas that flows through an exhaust passage to recirculate as EGR gas to the intake passage on an upstream side relative to the intercooler via an EGR passage; and a control device that, in a case where an engine load is in a predetermined high-load region, causes EGR gas to recirculate using the EGR device;
the internal combustion engine further comprising a guide device that is provided on a downstream side relative to the intercooler and that guides condensed water that is generated in the intercooler to a specific intake branch pipe among the plurality of intake branch pipes;
wherein, in a case where the vehicle is decelerated so that the engine load transitions from the predetermined high-load region to a predetermined low-load region to respond to a deceleration request with respect to the vehicle, the control device cuts a fuel supply to a specific cylinder that is connected to the specific intake branch pipe.

A second invention is the internal combustion engine according to the first invention, comprising:
a plurality of cylinders that are connected to the plurality of intake branch pipes; and a valve mechanism for driving an intake valve and an exhaust valve that are provided in each of the plurality of cylinders;
wherein the valve mechanism continues driving of an intake valve and an exhaust valve of the specific cylinder before, during and after execution of an operation to cut the fuel supply to the specific cylinder.

A third invention is the internal combustion engine according to the first or second invention, comprising:
a first cylinder group that is disposed at a front side of the vehicle; and a second cylinder group that disposed at a rear side of the vehicle and that, together with the first cylinder group, constitutes a V-type engine;
wherein the specific cylinder is a cylinder belonging to the first cylinder group.

Advantageous Effects

According to the first invention, in a case where a vehicle is decelerated so that an engine load transitions from a predetermined high-load region to a predetermined low-load region to respond to a deceleration request with respect to the vehicle, the fuel supply to a specific cylinder is cut and condensed water that is generated in an intercooler can be guided to the specific cylinder. By cutting the fuel supply to a specific cylinder, the load per cylinder of the remaining cylinders, that is, fuel supply cylinders, can be increased. Accordingly, the resistance to misfiring with respect to EGR gas in the fuel supply cylinders can be increased. Further, by guiding condensed water that is generated in the intercooler to a specific cylinder to which the fuel supply is cut at a time of deceleration of the vehicle, the condensed water can be prevented from flowing into an intake branch pipe of a fuel supply cylinder. Since an inflow of condensed water into a fuel supply cylinder can be prevented if the condensed water can be prevented from flowing into an intake branch pipe of the fuel supply cylinder, the occurrence of misfiring in the fuel supply cylinder can be suppressed.

According to the second invention, driving of an intake valve and an exhaust valve of a specific cylinder can be continued before, during and after execution of an operation to cut the fuel supply to the specific cylinder. When the intake and exhaust valves of the specific cylinder are continuously driven during and after the fuel cut operation, it is possible to cause condensed water which was caused to flow into an intake branch pipe of the specific cylinder to enter into the specific cylinder, and thereafter the condensed water can be discharged as water vapor into the exhaust passage. Further, if driving of the intake valve and exhaust valve of the specific cylinder is continued, it is also possible to cause EGR gas to flow into both the fuel supply cylinder and the specific cylinder. Accordingly, EGR gas that remains on the intake passage side can also be reduced in a short time period in comparison to a case where driving of the intake valve and exhaust valve of the specific cylinder is stopped.

According to the third invention, since an operation is executed to cut the fuel supply to cylinders belonging to a first cylinder group disposed on a front side of the vehicle, an inertial force that accompanies deceleration of the vehicle can be utilized to cause condensed water generated in the intercooler to flow into the first cylinder group.

BRIEF DESCRIPTION OF THE DRAWINGS

FIG. 1 is a schematic diagram illustrating the configuration of a system that includes an internal combustion engine according to Embodiment 1.

FIG. 2 is a schematic diagram of the interior of the intake manifold 22 shown in FIG. 1.

FIG. 3 is a cross-sectional view along a line A-A in FIG. 2.

FIG. 4 is a view for describing the fuel-cut control according to Embodiment 1.

FIG. 5 is a view for describing the flow direction of condensed water.

FIG. 6 is a view that illustrates a modification of the installation positions of the guide devices 22c.

FIG. 7 is a schematic diagram showing the interior of the intake manifold 22 of Embodiment 2.

FIG. 8 is a cross-sectional view along a line A-A in FIG. 7.

FIG. 9 is a schematic diagram showing the interior of the intake manifold 22 of Embodiment 3.

FIG. 10 is a cross-sectional view along a line A-A in FIG. 9.

FIG. 11 is a cross-sectional schematic diagram of the internal combustion engine 10 according to Embodiment 4.

FIG. 12 is a view of the periphery of the intercooler 24 when the internal combustion engine 10 shown in FIG. 11 is viewed from above.

FIG. 13 is a view of the periphery of the intercooler 24 when the internal combustion engine 10 shown in FIG. 11 is viewed from the side.

FIG. 14 is a schematic diagram of a vehicle in which the internal combustion engine 10 of Embodiment 4 is mounted.

DETAILED DESCRIPTION

Hereunder, embodiments of the present invention are described based on the attached drawings. Note that elements that are common to the respective drawings are denoted by the same reference characters, and a duplicate description thereof is omitted. Further, the present invention is not limited to the embodiments described hereunder.

Embodiment 1

First, Embodiment 1 of the present invention will be described referring to FIG. 1 to FIG. 6.

[Description of system configuration] FIG. 1 is a schematic diagram illustrating the configuration of a system that includes an internal combustion engine according to Embodiment 1. The system illustrated in FIG. 1 includes an internal combustion engine 10. The internal combustion engine 10 is configured as an in-line four-cylinder engine that is mounted in a vehicle, and the combustion order of the cylinders is: first cylinder #1, third cylinder #3, fourth cylinder #4, and second cylinder #2, which is the same as in a common engine. An intake passage 12 and an exhaust passage 14 communicate with each cylinder (combustion chamber) of the internal combustion engine 10.

An air cleaner 16 is installed in the vicinity of an inlet of the intake passage 12. A compressor 18a of a turbocharger 18 is arranged downstream of the air cleaner 16. The compressor 18a is driven by rotation of a turbine 18b that is disposed in the exhaust passage 14. An electronically controlled throttle valve 20 is provided in the intake passage 12 at a position that is on a downstream side of the compressor 18a. An intake manifold 22 that is connected to intake ports (not illustrated in the drawings) of the respective cylinders is provided in the intake passage 12 on the downstream side of the throttle valve 20. An intercooler 24 that cools intake gas that was compressed by the compressor 18a is contained inside the intake manifold 22. The internal configuration of the intake manifold 22 will now be described referring to FIG. 2.

FIG. 2 is a schematic diagram of the interior of the intake manifold 22 shown in FIG. 1. As shown in FIG. 2, the intake manifold 22 includes a convergence portion 22a that functions as a surge tank, and intake branch pipes 22b that connect the convergence portion 22a with the intake ports of the respective cylinders. Two guide devices 22c are provided at the bottom of the convergence portion 22a. One of the guide devices 22c is provided from the vicinity of an outlet portion on the left side of the intercooler 24 to a branching portion 22d between the first cylinder #1 and the second cylinder #2. The other guide device 22c is provided from the vicinity of an outlet portion on the right side of the intercooler 24 to a branching portion 22d between the third cylinder #3 and the fourth cylinder #4. FIG. 3 is a cross-sectional view along a line A-A in FIG. 2. As shown in FIG. 3, the respective guide devices 22c have a rectangular cross-sectional shape in which a distance from the bottom of the convergence portion 22a to the top face of the guide device 22c (that is, a height h of the respective guide devices 22c) is longer than a distance d between an opening edge of the respective intake branch pipes 22b that are indicated by dashed lines in the drawing and the bottom of the convergence portion 22a.

The description of the system configuration will now be continued with reference again to FIG. 1. A catalyst (as one example, a three-way catalyst) 26 for purifying exhaust gas is provided on a downstream side of the turbine 18b in the exhaust passage 14.

The system illustrated in FIG. 1 is also equipped with a low-pressure EGR device 28. The low-pressure EGR device 28 includes an EGR passage 30 that connects the exhaust passage 14 on a downstream side of the catalyst 26 with the intake passage 12 on an upstream side of the compressor 18a, and an EGR valve 32 that is provided at a position that is partway along the EGR passage 30. A portion of exhaust gas flowing through the exhaust passage 14 can be recirculated to the intake passage 12 as EGR gas by actuating the EGR valve 32 so as to open the EGR passage 30.

The system illustrated in FIG. 1 also includes an ECU (electronic control unit) 50. The ECU 50 includes at least an input/output interface, a memory, and a CPU. The input/output interface is provided in order to take in sensor signals from various sensors installed in the internal combustion engine 10 and the vehicle, and also to output actuating signals to actuators provided in the internal combustion engine 10. The sensors from which the ECU 50 takes in signals include an accelerator opening degree sensor 34 that detects an accelerator opening degree. In addition to the aforementioned throttle valve 20 and EGR valve 32, the actuators to which the ECU 50 outputs actuating signals also include injectors 36 that supply fuel to the respective cylinders (or an intake port of the respective cylinders) of the internal combustion engine 10, and a valve mechanism 38 for driving an intake valve and an exhaust valve (neither of which are illustrated in the drawings) of the respective cylinders. Various control programs and maps and the like for controlling the internal combustion engine 10 are stored in the memory. The CPU reads out a control program or the like from the memory and executes the control program, and generates actuating signals based on sensor signals that were taken in.

[Features of Embodiment 1] Next, features of Embodiment 1 will be described while referring to FIG. 4 to FIG. 5. In Embodiment 1, control (EGR control) is performed that, in a case where the engine load of the internal combustion engine 10 is in a predetermined high-load region, opens the EGR valve 32 to cause the exhaust passage 14 to communicate with the EGR passage 30 and thereby recirculate EGR, and in a case where the aforementioned engine load is in a predetermined low-load region, closes the EGR valve 32 to block off the EGR passage 30. The reason for performing this kind of EGR control is that resistance to misfiring with respect to EGR gas is low when the internal combustion engine 10 is operating under a low load. Note that, the predetermined high-load region and predetermined low-load region are previously stored in the memory of the ECU 50 as a load region map that is associated with the engine load. Further, the EGR control is performed based on the engine load of the internal combustion engine 10 and the aforementioned load region map, and the relevant engine load is estimated based on, for example, a degree of opening detected by the accelerator opening degree sensor 34.

As described above, in a case where there is a deceleration request with respect to the vehicle in which the internal combustion engine is mounted while EGR gas is being recirculated through the EGR passage, there is a possibility that a large amount of EGR gas that recirculated into the intake passage will cause the internal combustion engine to misfire. Likewise, in Embodiment 1 also, if a deceleration request is issued while the engine load of the internal combustion engine 10 is in a predetermined high-load region and the vehicle is then decelerated so that the engine load transitions from the high-load region to a low-load region to respond to the deceleration request, misfiring is liable to occur in the internal combustion engine 10.

Therefore, according to Embodiment 1, at the above described time of vehicle deceleration, fuel-cut control (hereunder, referred to as "partial cylinder F/C control") is performed that, on the one hand, continues the fuel supply from the injector 36 of the first cylinder #1 and the fourth cylinder #4, and on the other hand cuts the fuel supply from the injector 36 of the second cylinder #2 and the third cylinder #3. FIG. 4 is a view for describing the fuel-cut control according to Embodiment 1. It is assumed here that the accelerator opening degree decreases at a time t1, and the engine load transitions from a high-load region to a low-load region at a time t2. Since the EGR valve 32 is closed by EGR control when the engine load transitions from the high-load region to the low-load region, from the time t2 onwards the in-cylinder EGR rate (the flow ratio of EGR gas relative to intake gas that actually flows into the respective cylinders; the same applies hereinafter) decreases. However, the in-cylinder EGR rate changes with a delay with respect to closing of the EGR valve 32. Consequently, during a period from the time t2 until a time t3 at which the in-cylinder EGR rate becomes zero, the combustion limit in each cylinder decreases and the internal combustion engine 10 is liable to misfire (combustion limit $L_1$ in FIG. 4).

In this respect, by performing the partial cylinder F/C control, the load per cylinder can be increased in the first cylinder #1 and the fourth cylinder #4, that is, the cylinders in which the fuel supply from the respective injectors 36 is continued (hereunder, referred to as "combustion cylinders"). Accordingly, a decrease in the combustion limit can be suppressed and the resistance to misfiring with respect to EGR gas can be increased in these combustion cylinders (combustion limit $L_2$ in FIG. 4). A hatching portion in FIG. 4 indicates that the combustion resistance of the combustion cylinders is increased by the partial cylinder F/C control.

However, as described above, in an internal combustion engine equipped with a low-pressure EGR device, in some cases condensed water is generated in an intercooler, and such condensed water can also arise when a deceleration request has been issued. Condensed water can be generated in a similar manner in the intercooler 24 in Embodiment 1 also. In such a case, if the condensed water is discharged from the intercooler 24 and flows along the bottom of the convergence portion 22a and into the combustion cylinders, there is a possibility that the combustion limit in the combustion cylinders will drop and lead to misfiring (combustion limit $L_3$ in FIG. 4).

In this respect, according to Embodiment 1, as described above with reference to FIG. 2 and FIG. 3, the guide devices 22c are provided at the bottom of the convergence portion 22a. Therefore, as indicated by arrows in FIG. 5, condensed water that was generated in the intercooler 24 can be guided between the two guide devices 22c and caused to flow into the intake branch pipes 22b of the second cylinder #2 and the third cylinder #3, that is, the cylinders to which the fuel supply from the respective injectors 36 has been cut (hereunder, referred to as "combustion-paused cylinders"). In other words, an inflow of condensed water into the intake branch pipes 22b of the combustion cylinders can be prevented. If the condensed water can be prevented from flowing into the intake branch pipes 22b of the combustion cylinders, an inflow of the condensed water into the combustion cylinders can also be prevented. Accordingly, it is possible to favorably suppress the occurrence of a situation in which the effect that increases the combustion resistance in the combustion cylinders is impaired by an inflow of condensed water.

Further, in Embodiment 1, driving of the intake and exhaust valves of the combustion-paused cylinders by the valve mechanism 38 is continued during execution of the partial cylinder F/C control. Although it is a matter of course to continue driving of the intake and exhaust valves of the combustion cylinders before, during and after execution of the partial cylinder F/C control, by also continuing to drive the intake and exhaust valves of the combustion-paused cylinders, condensed water that flowed into the intake branch pipes 22b of the combustion-paused cylinders can be caused to flow into the combustion-paused cylinders and can be discharged as water vapor into the exhaust passage 14. Further, by continuing to drive the intake and exhaust valves of the combustion-paused cylinders, EGR gas can be caused to flow into both the combustion cylinders and the combustion-paused cylinders. Therefore, EGR gas remaining on the intake passage 12 side can be reduced in a short time in comparison to a case where driving of the intake and exhaust valves of the combustion-paused cylinders is stopped.

Thus, according to Embodiment 1, since partial cylinder F/C control is executed in a case where a deceleration request is issued while the engine load of the internal combustion engine 10 is in a predetermined high-load region and the vehicle is decelerated so that the engine load transitions from a high-load region to a low-load region to respond to the deceleration request, a decrease in the combustion limit can be suppressed and resistance to misfiring with respect to EGR gas can be increased in the combustion cylinders.

Furthermore, since condensed water generated in the intercooler 24 is caused to flow into the intake branch pipes 22b of the combustion-paused cylinders by the guide devices 22c, it is possible to favorably suppress the occurrence of a situation in which the effect that increases the combustion resistance in the combustion cylinders is impaired by an inflow of condensed water.

Further, since driving of the intake and exhaust valves of the combustion-paused cylinders by the valve mechanism 38 is continued before, during and after execution of the partial cylinder F/C control, condensed water that was caused to flow into the intake branch pipes 22b of the combustion-paused cylinders can be vaporized in the combustion-paused cylinders and discharged to the exhaust passage 14. Furthermore, the EGR gas remaining on the intake passage 12 side can be reduced in a short time in comparison to a case where operations to open and close the intake and exhaust valves of the combustion-paused cylinders are stopped.

Note that, in the foregoing Embodiment 1, the compressor 18a corresponds to a "compressor" in the above described first invention, the intercooler 24 corresponds to an "intercooler" in the first invention, the intake branch pipe 22b corresponds to an "intake branch pipe" in the first invention, a combustion-paused cylinder corresponds to a "specific cylinder" in the first invention, the intake branch pipe 22b of a combustion-paused cylinder corresponds to a "specific intake branch pipe" in the first invention, the low-pressure EGR device 28 corresponds to an "EGR device" in the first invention, the guide device 22c corresponds to a "guide device" in the first invention, and the ECU 50 corresponds to a "control device" in the first invention.

Further, in the above described Embodiment 1, the valve mechanism 38 corresponds to a "valve mechanism" in the above described second invention.

In this connection, in the above described Embodiment 1, the guide devices 22c that have a rectangular cross sectional shape are provided at the positions indicated in FIG. 2. However, various modifications are possible with respect to the shape and positions of the guide devices 22c as long as it is possible to block the movement of condensed water to the intake branch pipes 22b of the combustion cylinders. FIG. 6 is a view that illustrates a modification of the installation positions of the guide devices 22c. As shown in FIG. 6, even when a configuration is adopted in which one of the guide devices 22c is provided from the branching portion 22d between the first cylinder #1 and the second cylinder #2 to the side face of the convergence portion 22a, and the other of the guide devices 22c is provided from the branching portion 22d between the third cylinder #3 and the fourth cylinder #4 to the side face of the convergence portion 22a, the movement of condensed water to the intake branch pipes 22b of the combustion cylinders can be blocked. Note that, the present modification can also be applied to the embodiments described hereinafter.

Further, although in the above described Embodiment 1 a configuration is adopted in which driving of the intake and exhaust valves of the combustion-paused cylinders by the valve mechanism 38 is continued before, during and after execution of the partial cylinder F/C control, a configuration may also be adopted in which driving of the intake and exhaust valves of the combustion-paused cylinders is stopped during execution of the partial cylinder F/C control. The reason is that, even if driving of the intake and exhaust valves of the combustion-paused cylinders is stopped, condensed water generated in the intercooler 24 can be caused to flow into the intake branch pipes 22b of the combustion-paused cylinders by the guide devices 22c. Note that, the present modification can also be applied to the embodiments described hereinafter.

Furthermore, in the above described Embodiment 1 an example of a system that is equipped with the low-pressure EGR device 28 has been described. However, the present invention can also be applied to a system equipped with an EGR device (high-pressure EGR device) that causes a portion of exhaust gas that flows through an exhaust passage on an upstream side of a turbine to recirculate through an EGR passage into an intake passage on a downstream side of a compressor.

Embodiment 2

[Description of system configuration] Next, Embodiment 2 of the present invention will be described referring to FIG. 7 and FIG. 8.

The configuration of the system of Embodiment 2 is fundamentally the same as that of Embodiment 1 that is described above. However, Embodiment 2 differs from the configuration of the foregoing Embodiment 1 in the respect that the internal combustion engine 10 is an in-line two-cylinder engine that includes the first cylinder #1 and the second cylinder #2.

FIG. 7 is a schematic diagram showing the interior of the intake manifold 22 of Embodiment 2. As shown in FIG. 7, one guide device 22c is provided at the bottom of the convergence portion 22a. The guide device 22c is provided from the vicinity of an outlet portion on the right side of the intercooler 24 to the branching portion 22d between/the first cylinder #1 and the second cylinder #2. FIG. 8 is a cross-sectional view along a line A-A in FIG. 7. As shown in FIG. 8, the guide device 22c has a rectangular cross-sectional shape in which a distance from the bottom of the convergence portion 22a to the top face of the guide device 22c (that is, the height h of the guide device 22c) is longer than a distance d between an opening edge of the respective intake branch pipes 22b that are indicated by dashed lines in the drawing and the bottom of the convergence portion 22a.

[Features of Embodiment 2] As described in Embodiment 1, when a deceleration request is issued while the engine load of the internal combustion engine 10 is in a predetermined high-load region, and the vehicle is decelerated so that the engine load transitions from the high-load region to a low-load region to respond to the deceleration request, misfiring is liable to occur in the internal combustion engine 10. Therefore, in Embodiment 2, at the time of such kind of vehicle deceleration, partial cylinder F/C control is performed that, on the one hand, continues the fuel supply from the injector 36 of the second cylinder #2, and on the other hand cuts the fuel supply from the injector 36 of the first cylinder #1. By performing partial cylinder F/C control in this manner, the load per cylinder with respect to the combustion cylinder (specifically, the second cylinder #2) can be increased. Accordingly, a decrease in the combustion limit can be suppressed and resistance to misfiring with respect to EGR gas can be increased in the combustion cylinder.

Further, as described in Embodiment 1, it is possible for condensed water to be generated in the intercooler 24. In this regard, according to Embodiment 2 the guide device 22c is provided at the bottom of the convergence portion 22a as described above using FIG. 7. Therefore, condensed water generated in the intercooler 24 can be caused to flow along the guide device 22c and into the intake branch pipe 22b of the combustion-paused cylinder (specifically, the first cylinder #1). Accordingly, it is possible to favorably suppress the occurrence of a situation in which the effect that increases the combustion resistance in the combustion cylinder is impaired by condensed water.

The fact that driving of the intake and exhaust valves of the combustion-paused cylinder by the valve mechanism 38 is continued during execution of the partial cylinder F/C control is the same as in the above described Embodiment 1.

Embodiment 3

[Description of system configuration] Next, Embodiment 3 of the present invention will be described referring to FIG. 9 and FIG. 10.

The configuration of the system of Embodiment 3 is fundamentally the same as that of Embodiment 1 that is described above. However, Embodiment 3 differs from the configuration of the foregoing Embodiment 1 in the respect that the internal combustion engine 10 is an in-line six-cylinder engine that includes a first cylinder #1 to a sixth cylinder #6. Note that, the combustion order of the internal combustion engine 10 is: first cylinder #1, fifth cylinder #5, third cylinder #3, sixth cylinder #6, second cylinder #2 and fourth cylinder #4; or first cylinder #1, fourth cylinder #4, second cylinder #2, fifth cylinder #5, third cylinder #3 and sixth cylinder #6.

FIG. 9 is a schematic diagram showing the interior of the intake manifold 22 of Embodiment 3. As shown in FIG. 9, only one guide device 22c is provided at the bottom of the convergence portion 22a. The guide device 22c is provided from the vicinity of an outlet portion on the right side of the intercooler 24 to the branching portion 22d between the third cylinder #3 and the fourth cylinder #4. FIG. 10 is a cross-sectional view along a line A-A in FIG. 9. As shown in FIG. 10, the guide device 22c has a rectangular cross-sectional shape in which a distance from the bottom of the convergence portion 22a to the top face of the guide device 22c (that is, the height h of the guide device 22c) is longer than a distance d between an opening edge of the respective intake branch pipes 22b that are indicated by dashed lines in the drawing and the bottom of the convergence portion 22a.

[Features of Embodiment 3] As described in Embodiment 1, when a deceleration request is issued while the engine load of the internal combustion engine 10 is in a predetermined high-load region, and the vehicle is decelerated so that the engine load transitions from the high-load region to a low-load region to respond to the deceleration request, misfiring is liable to occur in the internal combustion engine 10. Therefore, in Embodiment 3, at a time of such kind of vehicle deceleration, partial cylinder F/C control is performed that, on the one hand, continues the fuel supply from the injector 36 of the fourth cylinder #4 to the sixth cylinder #6, and on the other hand cuts the fuel supply from the injector 36 of the first cylinder #1 to the third cylinder #3. By performing partial cylinder F/C control in this manner, the load per cylinder in the combustion cylinders (specifically, the fourth cylinder #4 to the sixth cylinder #6) can be increased. Accordingly, a decrease in the combustion limit can be suppressed and resistance to misfiring with respect to EGR gas can be increased in the combustion cylinders.

In addition, as described in Embodiment 1, it is possible for condensed water to be generated in the intercooler 24. In this regard, according to Embodiment 3 the guide device 22c is provided at the bottom of the convergence portion 22a as described above using FIG. 9. Therefore, condensed water generated in the intercooler 24 can be caused to flow along the guide device 22c and into the intake branch pipes 22b of the combustion-paused cylinders (specifically, the first cylinder #1 to third cylinder #3). Accordingly, it is possible to favorably suppress the occurrence of a situation in which the effect that increases the combustion resistance in the combustion cylinders is impaired by condensed water.

The fact that driving of the intake and exhaust valves of the combustion-paused cylinders by the valve mechanism 38 is continued during execution of the partial cylinder F/C control is the same as in the above described Embodiment 1.

Embodiment 4

[Description of system configuration] Next, Embodiment 4 of the present invention will be described referring to FIG. 11 to FIG. 14.

The configuration of the system of Embodiment 4 is fundamentally the same as that of Embodiment 1 that is described above. However, Embodiment 4 differs from the configuration of the foregoing Embodiment 1 in the respect that the internal combustion engine 10 is a V-type six cylinder engine (bank angle of 60°) in which a first cylinder #1, a third cylinder #3 and a fifth cylinder #5 constitute a cylinder group, and a second cylinder #2, a fourth cylinder #4 and a sixth cylinder #6 also constitute a cylinder group. Note that, the combustion order of the internal combustion engine 10 is: first cylinder #1, second cylinder #2, third cylinder #3, fourth cylinder #4, fifth cylinder #5 and sixth cylinder #6.

FIG. 11 is a cross-sectional schematic diagram of the internal combustion engine 10 according to Embodiment 4.

As shown in FIG. 11, the internal combustion engine 10 includes a first cylinder group constituted by the first cylinder #1, the third cylinder #3 and the fifth cylinder #5, and a second cylinder group constituted by the second cylinder #2, the fourth cylinder #4 and the sixth cylinder #6. The first cylinder group and second cylinder group are respectively connected to the intercooler 24 through the intake manifold 22. The intercooler 24 includes a case 24a, and a cooler core 24b that is contained in the case 24a. A guide device 24c is provided at the bottom of the case 24a.

A detailed description of the internal configuration of the intercooler 24 and the guide device 24c will now be described referring to FIG. 12 and FIG. 13. FIG. 12 is a view of the periphery of the intercooler 24 when the internal combustion engine 10 shown in FIG. 11 is viewed from above. As shown in FIG. 12, the cooler core 24b is housed on the upstream side in the case 24a, and a space is formed on the downstream side of the case 24a. The guide device 24c is provided at a most downstream position in the case 24a, that is, at a side face of the case 24a in which an opening for connecting with the convergence portion 22a is formed. FIG. 13 is a view of the periphery of the intercooler 24 when the internal combustion engine 10 shown in FIG. 11 is viewed from the side. As shown in FIG. 13, the guide device 24c is provided so as to cover a lower portion of the opening edge of the convergence portion 22a that is indicated by a dashed line in FIG. 13.

FIG. 14 is a schematic diagram of a vehicle in which the internal combustion engine 10 of Embodiment 4 is mounted. As shown in FIG. 14, the first cylinder group (first cylinder #1, third cylinder #3 and fifth cylinder #5) is disposed at the front side of the vehicle 40, and the second cylinder group (second cylinder #2, fourth cylinder #4 and sixth cylinder #6) is disposed at the rear side.

[Features of Embodiment 4] As described in Embodiment 1, when a deceleration request is issued while the engine load of the internal combustion engine 10 is in a predetermined high-load region, and the vehicle is decelerated so that the engine load transitions from the high-load region to a low-load region to respond to the deceleration request, misfiring is liable to occur in the internal combustion engine 10. Therefore, in Embodiment 4, at a time of such kind of vehicle deceleration, partial cylinder F/C control is performed that, on the one hand, continues the fuel supply from the injectors 36 of the second cylinder group, and on the other hand cuts the fuel supply from the injectors 36 of the first cylinder group. By performing partial cylinder F/C control in this manner, the load per cylinder with respect to the second cylinder group to which the fuel supply is continued can be increased. Accordingly, a decrease in the combustion limit can be suppressed and resistance to misfiring with respect to EGR gas can be increased in the second cylinder group.

Further, as described in Embodiment 1, it is possible for condensed water to be generated in the intercooler 24. Similarly, in Embodiment 4 also, it is possible for condensed water to be generated in cooler core 24b. In this regard, according to Embodiment 4 the guide device 24c is provided at the bottom of the case 24a as described above referring to FIG. 12. Therefore, condensed water generated in the cooler core 24b can be blocked by the guide device 24c and caused to flow into the convergence portion 22a of the first cylinder group to which the fuel supply is cut. Accordingly, the condensed water can be caused to pass through the convergence portion 22a of the first cylinder group and flow into the intake branch pipes 22b of the first cylinder group.

In addition, according to Embodiment 4, since the first cylinder group is disposed at the front side of the vehicle 40 as described above with reference to FIG. 14, an inertial force that accompanies deceleration of the vehicle 40 can also be utilized to cause the condensed water to flow into the convergence portion 22*a* of the first cylinder group. Accordingly, it is possible to favorably suppress the occurrence of a situation in which the effect that increases the combustion resistance in the second cylinder group is impaired by an inflow of condensed water.

Furthermore, in Embodiment 4, driving of the intake and exhaust valves of the first cylinder group by the valve mechanism 38 is continued during execution of the partial cylinder F/C control. Consequently, a similar effect as in the above described Embodiment 1 can be obtained.

Note that, in the above described Embodiment 4, the cooler core 24*b* corresponds to an "intercooler" in the above described first invention.

In this connection, although in the foregoing Embodiment 4 the internal combustion engine 10 is constituted by a V-type six-cylinder engine, the internal combustion engine 10 may be constituted by a V-type engine other than a V-type six-cylinder engine (for example, a V-type eight-cylinder engine or a V-type 12-cylinder engine). Similarly to the V-type six-cylinder engine, such kind of V-type engines have a first cylinder group and a second cylinder group. Therefore, if the first cylinder group and the second cylinder group are disposed on the front side and rear side of the vehicle, respectively, and the partial cylinder F/C control that on the one hand continues the fuel supply from the injectors of the second cylinder group disposed at the rear side, and on the other hand cuts the fuel supply from the injectors of the first cylinder group disposed at the front side is performed at a time of vehicle deceleration as described above, the same effects as in the foregoing Embodiment 4 can be obtained.

REFERENCE SIGNS LIST

- 10 internal combustion engine
- 12 intake passage
- 14 exhaust passage
- 18 turbocharger
- 18*a* compressor
- 18*b* turbine
- 22 intake manifold
- 22*a* convergence portion
- 22*b* intake branch pipes
- 22*c* guide device
- 22*d* branching portion
- 24 intercooler
- 24*a* case
- 24*b* cooler core
- 24*c* guide device
- 28 low-pressure EGR device
- 30 EGR passage
- 36 injector
- 38 valve mechanism
- 40 vehicle
- 50 ECU

The invention claimed is:

1. An internal combustion engine that is mounted in a vehicle, comprising:
    a compressor that is configured to compress intake gas that flows through an intake passage; an intercooler that is configured to cool intake gas that is compressed by the compressor;
    a plurality of intake branch pipes that branch on a downstream side relative to the intercooler;
    a plurality of cylinders that are separately connected to the plurality of intake branch pipes;
    an EGR device that is configured to cause a portion of exhaust gas that flows through an exhaust passage to recirculate as EGR gas to the intake passage on an upstream side relative to the intercooler via an EGR passage;
    a control device that is configured to cause EGR gas to recirculate using the EGR device when an engine load is in a predetermined high-load region; and
    a guide device that is provided on a downstream side relative to the intercooler and that is configured to guide condensed water that is generated in the intercooler to a specific intake branch pipe among the plurality of intake branch pipes and block the condensed water from entering an intake branch pipe other than the specific intake branch pipe,
    wherein the control device is also configured to cut a fuel supply to a specific cylinder among the plurality of cylinders that is connected to the specific intake branch pipe, while continuing to supply the fuel supply to a cylinder other than the specific cylinder among the plurality of cylinders, when the vehicle is decelerated, so that the engine load transitions from the predetermined high-load region to a predetermined low-load region to respond to a deceleration request with respect to the vehicle.

2. The internal combustion engine according to claim 1,
    wherein the control device is configured to drive an intake valve and an exhaust valve that are provided in each of the plurality of cylinders, and
    wherein the control device is also configured to continue driving of an intake valve and an exhaust valve of the specific cylinder before, during and after execution of an operation to cut the fuel supply to the specific cylinder.

3. The internal combustion engine according to claim 1, further comprising
    a first cylinder group that is disposed at a front side of the vehicle; and
    a second cylinder group that is disposed at a rear side of the vehicle and that, together with the first cylinder group, constitutes a V engine,
        wherein the specific cylinder is a cylinder belonging to the first cylinder group.

4. An internal combustion engine that is mounted in a vehicle, comprising:
    a compressor that is configured to compress intake gas that flows through an intake passage; an intercooler that is configured to cool intake gas that is compressed by the compressor;
    a plurality of intake branch pipes that branch on a downstream side relative to the intercooler;
    a plurality of cylinders that are separately connected to the plurality of intake branch pipes;
    an EGR device that is configured to cause a portion of exhaust gas that flows through an exhaust passage to recirculate as EGR gas to the intake passage on an upstream side relative to the intercooler via an EGR passage;
    an electronic control unit that is configured to cause EGR gas to recirculate using the EGR device when an engine load is in a predetermined high-load region; and
    a guide plate that is provided on a downstream side relative to the intercooler and that is configured to guide condensed water that is generated in the intercooler to a specific intake branch pipe among the plurality of intake branch pipes and block the condensed water from entering an intake branch pipe other than the specific intake branch pipe, wherein the electronic control unit is also configured to cut a fuel supply to a specific cylinder among the plurality of cylinders that is connected to the specific intake branch pipe, while continuing to supply the fuel supply to a cylinder other than the specific cylinder among the plurality of cylinders, when the vehicle is decelerated, so that the engine load transitions from the predetermined high-load region to a predetermined low-load region to respond to a deceleration request with respect to the vehicle.

* * * * *